United States Patent [19]
Reininger et al.

[11] Patent Number: 5,075,846
[45] Date of Patent: Dec. 24, 1991

[54] MEMORY ACCESS SERIALIZATION AS AN MMU PAGE ATTRIBUTE

[75] Inventors: Russell A. Reininger; William B. Ledbetter, Jr.; Robin W. Edenfield; Van B. Shahan; Ralph C. McGarity; Eric E. Quintana, all of Austin, Tex.

[73] Assignee: Motorola, Inc., Schaubmurg, Ill.

[21] Appl. No.: 414,335

[22] Filed: Sep. 29, 1989

[51] Int. Cl.⁵ .................................................. G06F 9/06
[52] U.S. Cl. .................................. 364/200; 395/425; 364/251.1
[58] Field of Search ... 364/200 MS File, 900 MS File

[56] References Cited

U.S. PATENT DOCUMENTS

| | | |
|---|---|---|
| 3,647,348 | 3/1972 | Smith et al. ............... 364/200 |
| 4,212,057 | 7/1980 | Devlin et al. .............. 364/200 |
| 4,604,685 | 8/1986 | Brown et al. ............... 364/200 |
| 4,631,674 | 12/1986 | Blandy .................... 364/200 |
| 4,680,700 | 7/1987 | Hester et al. .............. 364/200 |
| 4,710,868 | 12/1987 | Cocke et al. ............... 364/200 |

Primary Examiner—Stuart N. Hecker
Assistant Examiner—Michael A. Whitfield
Attorney, Agent, or Firm—Charlotte B. Johnson Whitaker

[57] ABSTRACT

A data processor having a serialization attribute on a page basis is provided. A set of page descriptors and transparent translation registers encode the serialization attribute as a cache mode. The data processor is a pipelined machine, having at least two function units, which operate independently of each other. The function units issues requests, for access to information stored in an external memory, to an access controller. The access controller serves as an arbitration mechanism, and grants the requests of the function units in accordance with the issuance order of the requests by the function units. When the memory access is marked serialized in the page descriptor, an access controller postpones the serialized access, until the completion of all pending memory accesses in the instruction sequence. All pending requests are then completed in a predetermined order, independent of the issuance order of the requests made by the function units, and all appropriate exception processing is completed. The postponed serialized access is then completed.

9 Claims, 2 Drawing Sheets

MEMORY ACCESS SERIALIZATION AS AN MMU PAGE ATTRIBUTE

FIELD OF THE INVENTION

This invention relates generally to data processors having memory mapped I/O, and more specifically to a data processor for serializing memory accesses.

BACKGROUND OF THE INVENTION

Today's high performance data processors execute a complex set of instructions, wherein each instruction is comprised of a sequence of simple machine operations. Typically, these data processors have instructions of varying length (number of machine operations), and execution time (number of clock cycles per instruction). of clock cycles per instruction). These variable length instructions are necessary to facilitate memory accesses by numerous instrucions operating in a variety of addressing modes.

In the conventional data processor each instruction is executed to completion before the next instruction is commenced. In order to improve the efficiency of machine operations, while increasing overall performance, pipelined data processors were implemented in conventional data processor designs. These pipelined data processors are capable of executing several instructions concurrently, thus dramatically improving the overall performance of the data processor. Often, implementation of a pipeline architecture is difficult, due to the variable length of the complex instructions executed by the conventional data processor. The multiple memory accesses associated with some instructions must be detected by the data processor to insure they work properly with I/O peripheral devices. In case where memory mapped I/O references to peripherals destructively change the state of the peripheral device, data read from an I/O port may flush the read buffer, and data written to an I/O port can change the data read from a different port on the same device. Consequently, the sequence of reads and writes must be controlled for the peripheral to function properly.

In some peripherals, the read address and the write address are not identical, therefore, some hardware or software must inform the data processor when a requested access needs serialization. Memory accesses for data processors with write-back buffers may not necessarily occur in the same sequence as the machine code specifies. The data processor must detect the out of sequence read before write access, and multiple access memory accesses (associated with the more complex instructions) to insure they work properly with I/O peripheral devices. The data processor can order the read and write transfers, thereby preventing multiple prefetched reads from the same location, by marking a transfer as "serialized".

In the prior art, are data processors in which the serialization occurs on the processor bus. Typically, in these data processors, the peripheral device responds to its address, once seen on the bus, with a message informing the data processor that the requested access is for a peripheral device, and requesting synchronization of the access. In these data processors the peripheral may not accept the access until the synchronization has occurred. Accordingly, the data processor must suspend the requested access, pending resolution of all write requests and exception conditions. The implementation of this approach requires the utilization of at least one pin encoding on the data processor to accommodate the peripheral handshake signal. Furthermore, additional logic is required to perform the serialization. Some data processors designate a fixed virtual or physical address range as serialized, however, this approach imposes additional limitations on the design of future data processors.

BRIEF DESCRIPTION OF THE INVENTION

An object of the present invention is to provide a system for reordering memory accesses made by an integrated circuit data processor.

It is another object of the present invention to provide a system having a serialization attribute on a page basis.

Yet another object of the present invention to provide a mechanism for serializing I/O references to peripheral devices while preserving upward code compatibility.

It is yet another object of the present invention to provide a mechanism for serialization of data issuance, as opposed to serialization of instruction issuance.

These and other objects of the present invention are achieved in a data processor having a first function unit (FU1) which requests access to a first selected logical address in said memory; a second function unit (FU2) which requests access to a second selected logical address in the memory, independent of the FU1; an address translation unit (ATU) for receiving each of the first and second logical addresses, and for translating each into a corresponding physical address using a selected one of a plurality of descriptors comprising address translation information extracted from one or more translation tables stored in memory; and an access controller for receiving the first and second physical address, and for performing each of the requested access at the corresponding physical addresses in said memory. In accordance with the present invention, each of the descriptors includes a serialize field the value of which is extracted from a selected one of the translation tables. The ATU asserts a serialize signal in response to the selected one of said plurality of descriptors having a predetermined value in said serialize field; and the access controller, in response to the serialize signal, performs the requested accesses in a predetermined order independent of the order in which said FU1 and FU2 request the accesses.

DETAILED DESCRIPTION OF THE INVENTION

Figure 1:
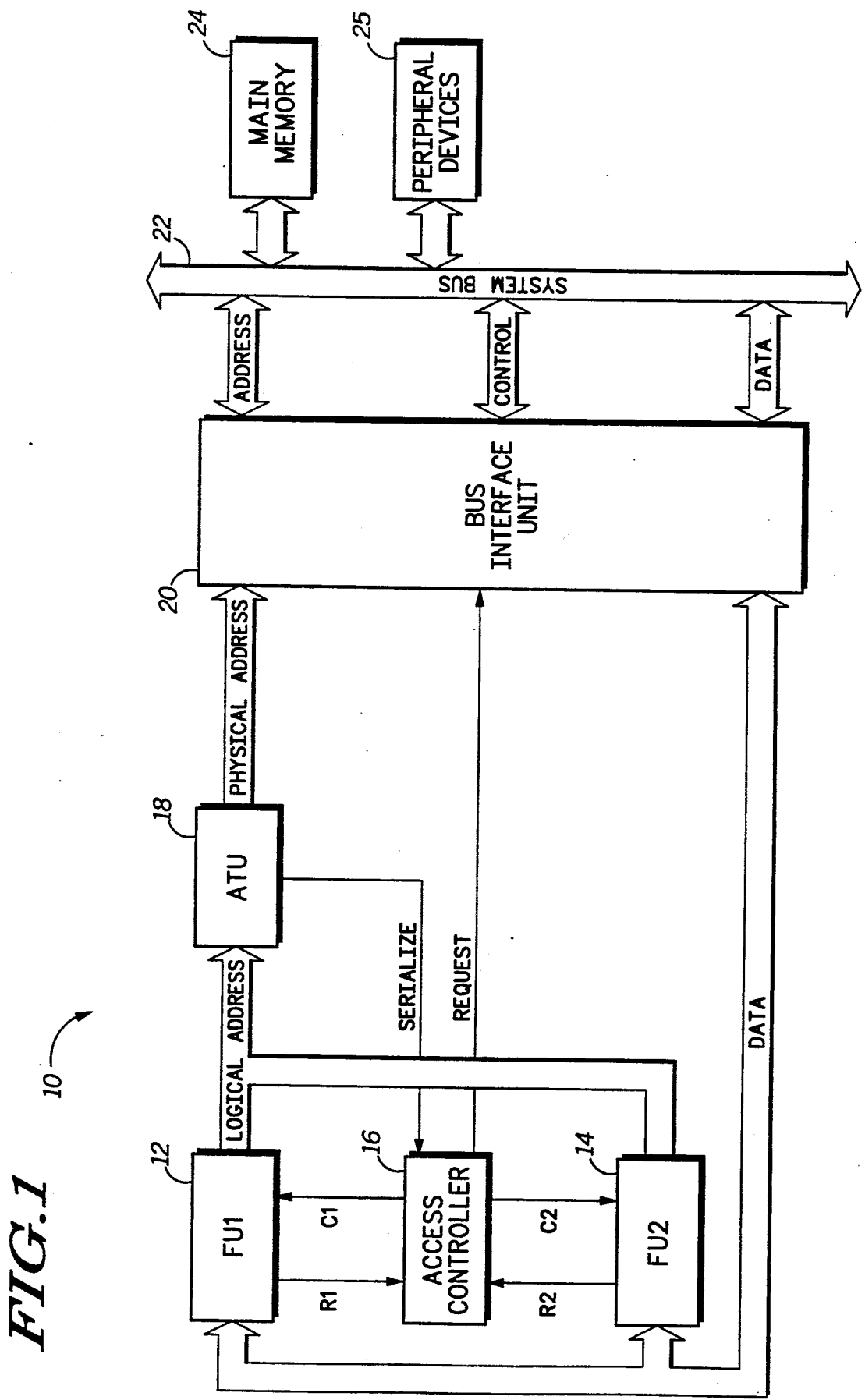
FIG. 1 is a block diagram illustrating a data processing system according to a preferred embodiment of the present invention.

Shown in FIG. 1 is a block diagram of a preferred embodiment of a data processing system 10, comprising a first functional unit (FU1) 12, a second functional unit (FU2) 14, and access controller 16, an address translation unit (ATU) 18, a bus interface unit 20, a system bus 22, and main memory 24, and peripheral devices 25. In the illustrated form, FU1 and FU2, 12 and 14 respectively, are internal functional units which issue requests for access to data operands stored in main memory 24, and execute instructions using the data operands provided by main memory 24.

In the preferred embodiment, FU1 12 issues a first request (R1) to access controller 16, thereby requesting access to information stored in main memory 24. Similarly, FU2 14 issues a second request (R2) to access controller 16, thereby requesting access to information stored in main memory 24. The access controller 16 transfers a first control signal C1 to FU1 12, enabling FU1 12 to drive the logical address, corresponding to the requested information, out onto the logical address bus for translation by the ATU 18. The ATU 18 translates the logical address into a corresponding physical address in memory, using a logical to physical translation descriptor stored either within the ATU 18 or in the main memory 24. In the later case, where the translation descriptor is not resident in ATU 18, the ATU 18 will perform a "tablewalk" of the translation tables stored in main memory 24, thereby retrieving the required descriptor from main memory 24. It should be obvious to one skilled in the art that a portion of the operating system will be responsible for "walking" the translation tables to retrieve the required descriptor. The required descriptor will then be transferred from main memory 24 to ATU 18.

Figure 2:
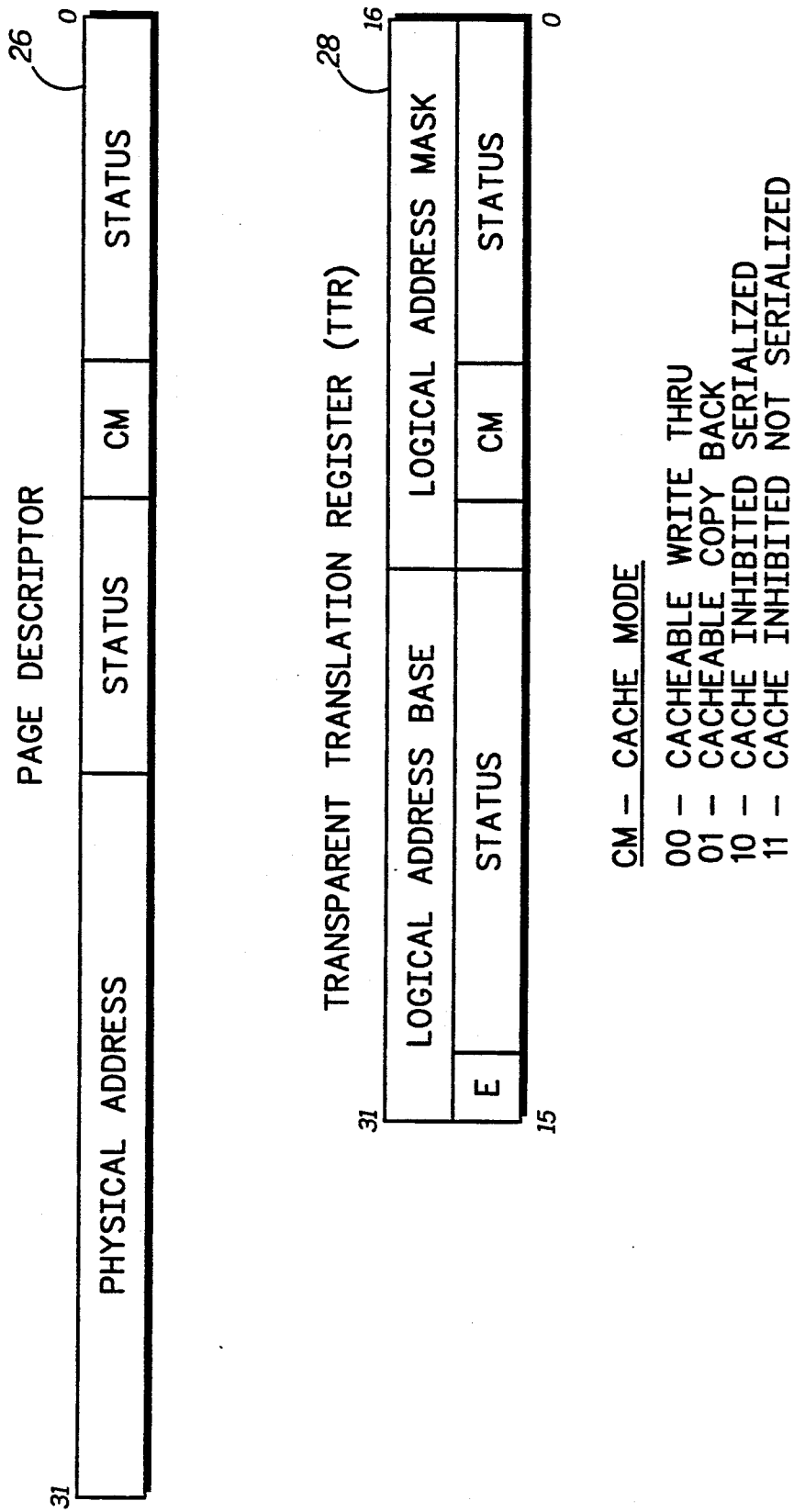
FIG. 2 is a diagram illustrating the serialization encodings in an address translation unit (ATU) page descriptor, and a transparent translation register.

Upon completion of the logical to physical address translation, ATU 18 will transfer status information to the access controller 16. In the preferred embodiment, the status information is contained in a page descriptor, as shown in FIG. 2. A serialization attribute is encoded as a cache mode (cacheable copyback, cacheable write-through, non-cacheable, and non-cacheable serialized). Accordingly, a two (2) bit field in the page descriptor contains the serialization attribute for the requested access. If the memory access is marked "not serialized", the ATU 18 will negate the SERIALIZE signal, thereby informing the access controller 16 that the requested access is "not serialized". In response to the negation of the SERIALIZE signal, the access controller 16 will transfer a bus REQUEST signal to the bus interface unit 20, and the ATU 18 will transfer the physical address onto the system bus 22, via bus interface unit 20. In response to receiving each physical address, the memory 24 will transfer the requested data operand to FU1 12 and FU2 14, via the bus interface unit 20.

In the case where the requested memory access is marked "serialized" in the page descriptor, the ATU 18 will assert the SERIALIZE signal. In response to the assertion of the SERIALIZE signal, the access controller 16 will enter an arbitration mode, wherein the access controller 16 will only grant requests made for accesses of a predetermined type in the instruction sequence. For example, in the case where the protocol requires that serialized read accesses be postponed until all pending writes requests in the sequence are complete, the access controller 16 will only assert C1 and C2 in response to write requests issued by FU1 12 and FU2 14, respectively. Conversely, if the protocol mandates the completion of all read requests in the sequence before the external bus transfer starts for a serialized write access, then access controller 16 will only assert C1 and C2 in response to read requests issued by FU1 12 and FU2 14, respectively.

The physical address of the serialized request (read or write) is temporarily stored in ATU 18, pending the resolution of a predetermined number of memory accesses in the instruction sequence. Accordingly, data processor 10 will continue in a normal execution mode with FU1 12 and FU2 14 issuing request, R1 and R2 respectively, to the access controller 16, and thereby accessing information stored in main memory 24. It should be obvious to one of ordinary skill that the access controller 16 will adapt its operation upon the occurrence of an interrupt, to insure that interrupts are serviced at boundaries which will not cause the re-issuance of a given request on the system bus 22. Upon completion of all pending memory accesses in the instruction sequence, access controller 16 transfers the bus REQUEST signal to bus interface unit 20, thereby allowing the ATU 18 to transfer the physical address for the serialized access onto the system bus 22. The data operand is retrieved from, or transferred to, the respective physical address in main memory 24, and transferred, via the bus interface unit 20, to or from the requesting function unit FU1 or FU2, 12 and 14 respectively.

While the present invention has been described in a preferred embodiment, it will be apparent to those skilled in the art that the disclosed invention may be modified in numerous ways and may assume many embodiments other than that specifically set out and described above. For example, portions of the logical address space may be transparently mapped into the physical address space, without a resident page descriptor 26 in the ATU 18, by using a transparent translation register (TTR) 28, as shown in FIG. 2. The serialization attribute may be encoded in a bit field in a transparent translation register 28 contained in the ATU 18. In the preferred embodiment, the serialization encoding is contained in the cache mode (CM) field. Using a LOGICAL ADDRESS BASE field, and a LOGICAL ADDRESS MASK field, the TTR 28 defines a range of logical addresses which will be transparently mapped. The operating system is responsible for loading TTR 28 with the appropriate logical address. When TTR 28 is enabled (E), a logical address from FU1 12 or FU2 14, matching the contents of TTR 28 is output as a physical address directly (transparently translated). A predetermined number of the logical address bits (e.g. A31–A24) are used in a match equation, therefore no page descriptor 26 is fetched or used. In an alternate embodiment, a bit contained in a page descriptor 26 or TTR 28 may be used to indicate that the requested data operand is "cacheable and serialized".

FU1 and FU2 may be portions of the same pipeline or independent units. Accordingly, it is intended by the appended claims to cover all modifications of the invention which fall within the true spirit and scope of the invention.

We claim:

1. In a data processor adapted for use with a memory, the data processor comprising:
   a first function unit (FU1) which requests access to a first selected logical address in said memory;
   a second function unit (FU2) which requests access to a second selected logical address in said memory, independent of said FU1;
   an address translation unit (ATU) for receiving each of said first and second logical addresses, and for translating each into a corresponding physical address using a selected one of a plurality of descriptors comprising address translation information extracted from one or more translation tables stored in said memory; and
   access control means for receiving said first and second physical address, and for performing each of said requested accesses at said corresponding physical addresses in said memory;

the improvement wherein:

each of said descriptors includes a serialize field, the value of which is extracted from a selected one of said translation tables;

said ATU asserts a serialize signal in response to said selected one of said plurality of descriptors having a predetermined value in said serialize field; and said access control means, in response to said serialize signal, performing said requested accesses in a predetermined order independent of the order in which said FU1 and FU2 request said accesses.

2. The data processor of claim 1 wherein said FU1 requests access to said first selected logical address in said memory in response to a first control signal provided by said access controller.

3. The data processor of claim 2 wherein said FU2 requests access to said second selected logical address in said memory in response to a second control signal provided by said access controller.

4. In a data processor for use with a memory, the data processor comprising:

a first function unit (FU1) which issues a first request for access to a first selected logical address in said memory;

a second function unit (FU2) which issues a second request for access to a second selected logical address in said memory;

an address translation unit (ATU) for receiving each of said first and second logical addresses, and for translating each into a corresponding physical address using a selected one of a plurality of descriptors comprising information extracted from one or more translation tables stored in said memory; and access control means for receiving said first and second physical addresses, and for performing each of said requested accesses at said corresponding physical addresses in said memory;

the improvement wherein:

each of said descriptors includes a serialize field, the value of which is extracted from a selected one of said translation tables;

said ATU asserts a serialize signal in response to said selected one of said plurality of descriptors having a predetermined value in said serialize field; and said access control means, in response to said serialize signal, performing said requested accesses in a predetermined order independent of the order in which said FU1 and FU2 issues said first and second requests, respectively.

5. The data processor of claim 4 wherein said FC1 issues said first request for access to said memory in response to said first control signal provided by said access control means.

6. The data processor of claim 5 wherein said FC2 issues said second request for access to said memory in response to said second control signal provided by said access control means.

7. In a data processor adapted for use with a memory, the data processor comprising:

a first function unit (FU1) which asserts a first request signal for access to said memory, and, in response to a first control signal, issues a first selected logical address in said memory for said access;

a second function unit (FU2) which asserts a second request signal for access to said memory, independent of FU1, and, in response to a second control signal, issues a second selected logical address in said memory for said access;

an access controller which receives said first and second requests, and selectively asserts said first and second control signals in response to the assertion thereof;

an address translation unit (ATU) for receiving each of said first and second logical addresses, and for translating each into a corresponding physical address using a selected one of a plurality of descriptors comprising address translation information extracted from one or more translation tables stored in said memory; and a bus interface unit for receiving each of said physical addresses, and for performing each of said requested accesses at said corresponding physical addresses in said memory;

the improvement wherein:

each of said descriptors includes a serialize field the value of which is extracted from a selected one of said translation tables;

said ATU asserts a serialize signal in response to said selected one of said plurality of descriptors having a predetermined value in said serialize field; and said access controller, in response to said serialize signal, asserts said first and second control signals in a predetermined order independent of the order of assertion of said first and second request signals.

8. The data processor of claim 7 wherein said FC1 issues said first request for access to said memory in response to said first control signal provided by said access control means.

9. The data processor of claim 8 wherein said FC2 issues said second request for access to said memory in response to said second control signal provided by said access control means.

* * * * *